United States Patent
Chinbayar et al.

(10) Patent No.: US 12,467,080 B2
(45) Date of Patent: Nov. 11, 2025

(54) PNA OLIGOMER, USE THEREOF FOR DETECTING DNA METHYLATION, AND METHOD FOR DETECTING DNA METHYLATION USING SAME

(71) Applicant: SEASUNBIO MATERIAL, Daejeon (KR)

(72) Inventors: Bat Ochir Chinbayar, Daejeon (KR); Hee Kyung Park, Daejeon (KR)

(73) Assignee: SEASUNBIO MATERIALS, Daejeon (KR)

( * ) Notice: Subject to any disclaimer, the term of this patent is extended or adjusted under 35 U.S.C. 154(b) by 1067 days.

(21) Appl. No.: 17/433,248

(22) PCT Filed: Sep. 1, 2020

(86) PCT No.: PCT/KR2020/011692
§ 371 (c)(1),
(2) Date: Aug. 24, 2021

(87) PCT Pub. No.: WO2021/045479
PCT Pub. Date: Mar. 11, 2021

(65) Prior Publication Data
US 2022/0162681 A1    May 26, 2022

(30) Foreign Application Priority Data
Sep. 2, 2019    (KR) .................. 10-2019-0108251

(51) Int. Cl.
C12Q 1/68        (2018.01)
*C12Q 1/6827*    (2018.01)
*C12Q 1/686*     (2018.01)
*C12Q 1/6876*    (2018.01)

(52) U.S. Cl.
CPC .......... *C12Q 1/6827* (2013.01); *C12Q 1/686* (2013.01); *C12Q 1/6876* (2013.01); *C12Q 2600/154* (2013.01)

(58) Field of Classification Search
CPC .... C12Q 1/6827; C12Q 1/686; C12Q 1/6876; C12Q 2600/154; C07K 14/003
See application file for complete search history.

(56) References Cited

U.S. PATENT DOCUMENTS

| | | |
|---|---|---|
| 2003/0207266 A1 | 11/2003 | Chen et al. |
| 2004/0034191 A1 | 2/2004 | Manoharan |
| 2017/0058325 A1 | 3/2017 | Ly et al. |

FOREIGN PATENT DOCUMENTS

| | | | |
|---|---|---|---|
| JP | 2002535998 | A | 10/2002 |
| KR | 10-2018-0108137 | A | 10/2018 |
| KR | 101969971 | B1 | 4/2019 |
| WO | 9949293 | A2 | 9/1999 |
| WO | 9949293 | A3 | 4/2000 |
| WO | 2005059172 | A2 | 6/2005 |
| WO | 2005059172 | A3 | 12/2005 |
| WO | 2019018422 | A1 | 1/2019 |
| WO | 2019120635 | A1 | 6/2019 |

OTHER PUBLICATIONS

Luca Morandi, et al., "Promoter methylation analysis of O6-methylguanine-DNA methyltransferase in glioblastoma: detection by locked nucleic acid based quantitative PCR using an imprinted gene (SNURF) as a reference", Morandi et al., BMC Cancer, 2010, 10:48, http://www.biomedcentral.com, 1471-2407/10/48, pp. 1-12.
Korean Office Action for Application No. 10-2019-0108251, dated Sep. 26, 2024 [Machine Translation].
Singaporean Office Action for Application No. 11202201971Q, dated Aug. 9, 2024.
European search report for Application No. 20860484.3, mailed Sep. 9, 2023.
Seitz et al., "Convergent strategies for the attachment of fluorescing reporter groups to peptide nucleic acids in solution and on solid phase." Chemistry—A European Journal 7.18: 3911-3925 (2001).

*Primary Examiner* — Jezia Riley
(74) *Attorney, Agent, or Firm* — NIXON PEABODY LLP

(57) ABSTRACT

The present invention relates to a modified PNA oligomer for detecting gene methylation. By using a PNA probe modified by introducing a methyl group-specific substituent to the gamma position, N-terminus or C-terminus of the PNA, the present invention may be used for a method for detecting using a difference in physical properties between a gene and a non-methylated gene caused by an interaction between the probe and methyl groups of the gene.

9 Claims, 2 Drawing Sheets

Specification includes a Sequence Listing.

【FIG. 1】
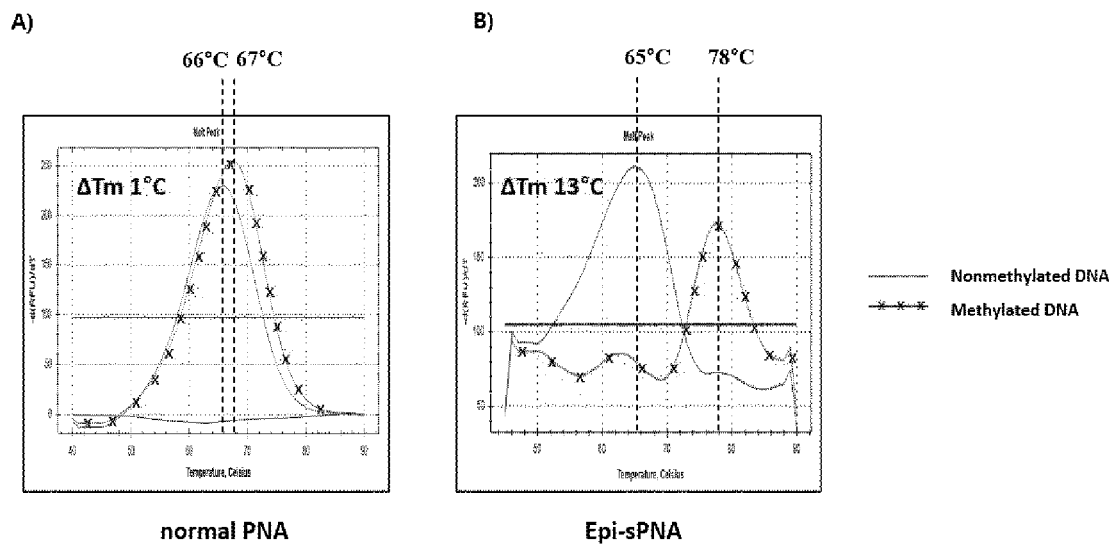
【FIG. 2】
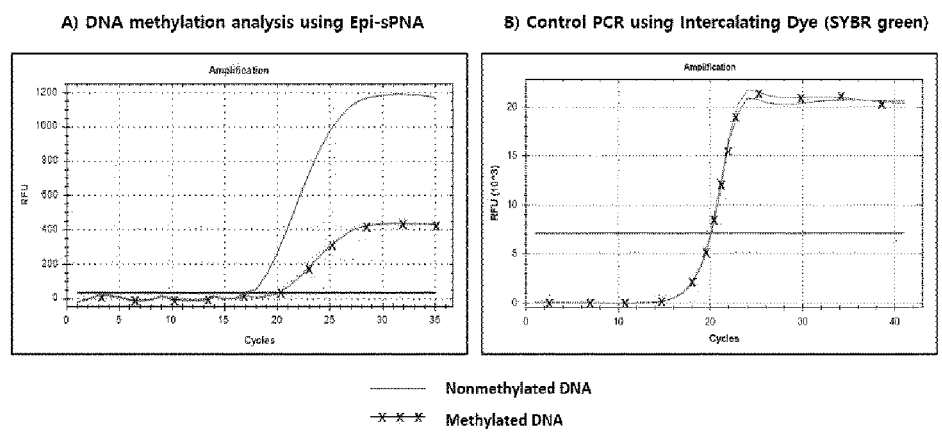

【FIG. 3】
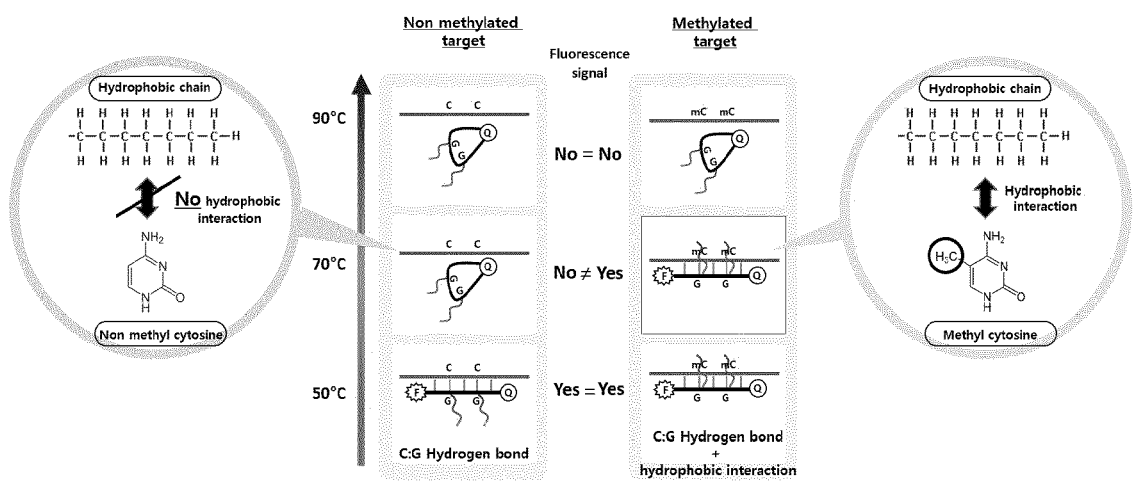

PNA OLIGOMER, USE THEREOF FOR DETECTING DNA METHYLATION, AND METHOD FOR DETECTING DNA METHYLATION USING SAME

CROSS-REFERENCE TO RELATED APPLICATIONS

This application is the United States National Phase of International Application No.: PCT/KR2020/011692, filed Sep. 1, 2020, which in turn claims priority benefit of The Republic of Korea Application No.: KR 10-2019-0108251, filed Sep. 2, 2019, the entire contents of which are herein incorporated by reference in their entirety.

TECHNICAL FIELD

The present invention relates to a peptide nucleic acid (PNA) oligomer, and more particularly, to the technology for detecting DNA methylation using a novel PNA probe.

BACKGROUND ART

DNA methylation occurs mainly on cytosines of a CpG island in a promoter region of a certain gene, and thus obstructs the binding of transcription factors to interrupt expression of the certain gene (gene silencing), which acts as a main mechanism by which the function of the gene is lost in vivo without any mutations in a base sequence of the gene. Also, the gene silencing has been interpreted as a cause of loss in functions of many tumor suppressor genes in human cancer cells.

It was confirmed that abnormal methylation/demethylation in the promoter CpG islands interrupts expression of tumor suppressor genes, DNA repair genes, cell cycle regulatory genes, and the like because these genes are hyper-methylated in various cancers. In particular, it is well known that the hyper-methylation occurs in a promoter region of a certain gene in the early stage of carcinogenesis. Therefore, the promoter methylation of tumor-related genes is an important indicator of cancer, which may be used in various fields such as early diagnoses of cancer, prediction of carcinogenic risk, prediction of cancer prognosis, post-treatment follow-up survey, predict on of response to chemotherapy, and the like. In recent years, attempts have been ardently made to perform examinations using methods such as bisulfite sequencing, combined bisulfite restriction analysis (COBRA), pyrosequencing, a methylation-specific polymerase chain reaction (methylation-specific PCR: MSP), and the like in order to use them in cancer diagnosis and screening, and the like. In fact, an attempt has been ardently made to examine promoter methylation of tumor-related genes in blood, sputum, saliva, stool, urine, or the like in order to use it in various cancer treatments.

However, a method of treating a gene with bisulfite and a methylation-specific enzyme most commonly used by researchers to check DNA methylation and performing MSP is a method of confirming a methylation state of individual cytosines in DNA using the fact that the gene is treated with bisulfite to convert non-methylated cytosines into uracils and already methylated 5-methyl cytosines are maintained as they are, but has limitations on the number of gens and the number of specimens that may be examined at a time, and has a drawback in that it requires a large amount of DNA during detection because 90% or more of the genomic DNA is degraded when treated with bisulfite. Also, it has problems in that it is difficult to design primers for detection according to the conversion ratio or efficiency of cytosine into uracil, and the detection results are poorly reproducible due to non-specific binding of the primers.

Moreover, errors in conversion into thymine, and the like may occur because non-methylated cytosine is not converted into uracil or 5-methyl cytosine is maintained as it is even when DNA is treated with bisulfite. A method for detecting DNA methylation, which requires bisulfite treatment due to such errors, has a problem in that it shows false positive results, resulting in poor accuracy, specificity, sensitivity, and reproducibility.

Meanwhile, a peptide nucleic acid (PNA) is a pseudo DNA to which a nucleobase is bound via a peptide bond rather than sugar and phosphate bonds, and was first reported in 1991. PNA is an artificial nucleic acid that is synthesized by a chemical method and is not found in nature. The PNA has a known common structure in which N-(2-aminoethyl)glycine (N-(2-aminoethyl)glycine) units are repeatedly connected via an amide bond to form a N-(2-aminoethyl)glycine backbone, and the backbone is hybridized with natural nucleic acids of a complementary base sequence to form a double strand because the backbone has nucleic acid bases such as purine bases (A and G) and pyrimidine bases (C and T).

When a PNA/DNA double strand has the same length as a DNA/DNA double strand, the PNA/DNA double strand is more stable than the DNA/DNA double strand, and has a superior ability to detect SNP compared to the natural nucleic acids because the DNA/DNA double strand has a high degree of instability due to the single nucleotide polymorphism (SNP). PNA is not only chemically stable but also biologically stable because it is not degraded by nucleases or proteases.

Research using the nature of PNA that is stable against biological enzymes in this way has been conducted. One example is to use it as a probe. For example, a PNA probe may be used in various detection methods by adjusting the hybridization efficiency between the PNA probe and target nucleic acids.

Therefore, in order to solve the above problems of the conventional methods, the present inventors have designed a PNA probe capable of easily detecting DNA methylation without any treatment with bisulfite in the method for detecting DNA methylation, and a method for detecting DNA methylation using the PNA probe.

DISCLOSURE

Technical Problem

An object of the present invention is to provide a novel PNA oligomer capable of detecting gene methylation without pretreatment with bisulfite, and a PNA probe for detecting a methylated gene.

Another object of the present invention is to provide a method for detecting the presence of gene methylation without amplification of a gene using a PNA probe without pretreatment with bisulfite or by selectively amplifying a non-methylated DNA while suppressing amplification of a methylated DNA in order to make use of a difference in cycle threshold (Ct) between respective PCR products.

Still another object of the present invention is to provide a kit for detecting the presence of gene methylation without amplification of a gene using a novel PNA probe or by selectively amplifying a non-methylated DNA while suppressing amplification of a methylated DNA in order to make use of a difference in Ct between respective PCR products.

Technical Solution

In one general aspect, a peptide nucleic acid (PNA) oligomer is represented by the following Formula 1:

[Formula 1]

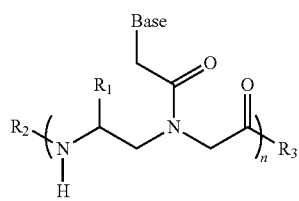

wherein $R_1$ is a hydrophobic substituent, $R_2$ is hydrogen or a hydrophobic substituent, $R_3$ is a hydroxyl group or a hydrophobic substituent, Base is any one base selected from natural or non-natural nucleobases including adenine, thymine, guanine, cytosine, and uracil, n is an integer ranging from 5 to 30, and respective structural units included in the PNA oligomer may be the same or different from each other.

According to one embodiment of the present invention, the hydrophobic substituent of Formula 1 is each independently selected from the group consisting of a $C_3$-$C_{30}$ alkyl group, a $C_3$-$C_{30}$ alkenyl group, a $C_3$-$C_{30}$ alkynyl group, a $C_6$-$C_{30}$ aryl group, a $C_3$-$C_{30}$ heteroaryl group, an amino acid including a hydrophobic group, and a combination thereof, any one or more of hydrogen atoms of the hydrophobic substituent may be replaced by a halogen element, any one or more of carbon atoms of the alkyl group, the alkenyl group, or the alkynyl group may be replaced by O or S, and the heteroaryl group may include any one or more selected from B, N, O, S, P(=O), Si, and P.

According to one embodiment of the present invention, the hydrophobic substituent of $R_1$ in Formula 1 may include any one or more selected from the group consisting of a $C_3$-$C_{30}$ alkyl group, a $C_3$-$C_{30}$ alkenyl group, and a $C_3$-$C_{30}$ alkynyl group.

According to one embodiment of the present invention, the hydrophobic substituent of $R_1$ in Formula 1 may be a $C_8$-$C_{18}$ alkyl group.

According to one embodiment of the present invention, the amino acid including a hydrophobic group may each independently include any one selected from the group consisting of isoleucine (Ile), valine (Val), leucine (Leu), phenylalanine (Phe), cysteine (Cys), methionine (Met), alanine (Ala), glycine (Gly), threonine (Thr), and tryptophan (Trp).

In another general aspect, a PNA probe for detecting a methylated gene is represented by the following Formula 1:

[Formula 1]

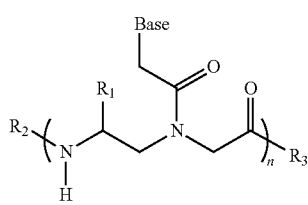

wherein $R_1$ is a hydrophobic substituent, $R_2$ is hydrogen or a hydrophobic substituent, $R_3$ is a hydroxyl group or a hydrophobic substituent, Base is any one base selected from natural or non-natural nucleobases including adenine, thymine, guanine, cytosine, and uracil, n is an integer ranging from 5 to 30, and respective structural units included in the PNA oligomer may be the same or different from each other.

According to one embodiment of the present invention, in the PNA probe for detecting gene methylation, the hydrophobic substituent of Formula 1 is each independently selected from the group consisting of a $C_3$-$C_{30}$ alkyl group, a $C_3$-$C_{30}$ alkenyl group, a $C_3$-$C_{30}$ alkynyl group, a $C_6$-$C_{30}$ aryl group, a $C_3$-$C_{30}$ heteroaryl group, an amino acid including a hydrophobic group, and a combination thereof, any one or more of hydrogen atoms of the hydrophobic substituent may be replaced by a halogen element, any one or more of carbon atoms of the alkyl group, the alkenyl group, or the alkynyl group may be replaced by O or S, and the heteroaryl group may include any one or more selected from B, N, O, S, P(=O), Si, and P.

According to one embodiment of the present invention, the hydrophobic substituent of $R_1$ in Formula 1 may include any one or more selected from the group consisting of a $C_3$-$C_{30}$ alkyl group, a $C_3$-$C_{30}$ alkenyl group, and a $C_3$-$C_{30}$ alkynyl group.

According to one embodiment of the present invention, the hydrophobic substituent of $R_1$ in Formula 1 may be a $C_8$-$C_{18}$ alkyl group.

According to one embodiment of the present invention, the amino acid including a hydrophobic group may each independently include any one selected from the group consisting of isoleucine (Ile), valine (Val), leucine (Leu), phenylalanine (Phe), cysteine (Cys), methionine (Met), alanine (Ala), glycine (Gly), threonine (Thr), and tryptophan (Trp).

According to one embodiment of the present invention, the PNA probe may further include any one selected from the group consisting of a reporter and a quencher, or a combination of two thereof.

According to one embodiment of the present invention, the PNA probe may include a reporter bound to the C-terminus thereof and a quencher bound to the N-terminus thereof, or may include a reporter bound to the N-terminus thereof and a quencher bound to the C-terminus thereof.

In still another general aspect, there is provided a method for detecting a methylated gene using the PNA probe.

According to one specific embodiment, the method for detecting a methylated gene may include: preparing a first mixture including a non-methylated gene and a PNA probe represented by the following Formula 1, which may specifically bind to a base sequence of the non-methylated gene; preparing a second mixture including a target gene for methylation analysis, which includes the same base sequence as the base sequence of the non-methylated gene, and the PNA probe represented by the following Formula 1; changing temperatures of the first mixture and the second mixture; and analyzing a melting curve by measuring melting temperatures (Tm) of the first mixture and the second mixture according to the temperature change:

[Formula 1]

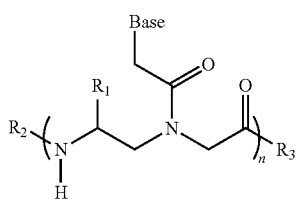

wherein $R_1$ is a hydrophobic substituent, $R_2$ is hydrogen or a hydrophobic substituent, $R_3$ is a hydroxyl group or a hydrophobic substituent, Base is any one base selected from natural or non-natural nucleobases including adenine, thymine, guanine, cytosine, and uracil, n is an integer ranging from 5 to 30, and respective structural units included in the PNA probe may be the same or different from each other.

According to one embodiment of the present invention, the analyzing of the melting curve may include judging a gene to be methylated when it is assumed that ΔTm is greater than or equal to 3° C. when the ΔTm is measured, and the ΔTm satisfies the following equation: ΔTm=Tm (Target Gene for Methylation Analysis)−Tm (Non-methylated Gene Including the Same Base Sequence as Target Gene for Methylation Analysis).

According to one embodiment of the present invention, the method for detecting a methylated gene may include preparing a first mixture including a non-methylated gene and a PNA probe represented by the following Formula 1, which may specifically bind to a base sequence of the non-methylated gene; preparing a second mixture including a target gene for methylation analysis, which includes the same base sequence as the base sequence of the non-methylated gene, and the PNA probe represented by the following Formula 1; subjecting the first mixture and the second mixture to a polymerase chain reaction (PCR); and measuring a cycle threshold (ΔCt) value of the PCR. In this case, the cycle threshold (ΔCt) value satisfies the following equation: ΔCt=Ct (Target Gene for Methylation Analysis)−Ct (Non-methylated Gene Including the Same Base Sequence as Target Gene for Methylation Analysis).

In yet another general aspect, a kit for use in the method for detecting a methylated gene includes a PNA probe represented by the following Formula 1, which may specifically bind to a base sequence of a gene whose methylation may occur:

[Formula 1]

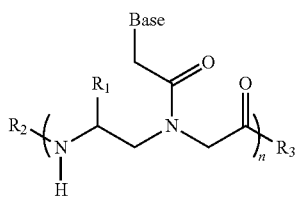

wherein $R_1$ is a hydrophobic substituent, $R_2$ is hydrogen or a hydrophobic substituent, $R_3$ is a hydroxyl group or a hydrophobic substituent, Base is any one base selected from natural or non-natural nucleobases including adenine, thymine, guanine, cytosine, and uracil, n is an integer ranging from 5 to 30, and respective structural units included in the PNA probe may be the same or different from each other.

In yet another general aspect, a method for detecting gene methylation includes mixing the PNA probe for detecting gene methylation with a biological sample to hybridize the PNA probe with a target gene included in the biological sample; applying heat to the resulting mixture at a temperature higher than a melting temperature (Tm) of a hybrid of a non-methylated gene and the PNA probe and lower than a hybrid of a methylated gene and the PNA probe; and removing the hybrid of the non-methylated gene and the PNA probe melted at the temperature, wherein the gene methylation is detected through an imaged fluorescence signal of the hybrid of the methylated gene and the PNA probe.

Advantageous Effects

A method for detecting a methylated gene according to the present invention can detect the presence of gene methylation in a short time even without any process for amplifying a gene using a melting curve analysis method. Also, a trace of a methylated gene included in a sample can be detected with excellent sensitivity and specificity using ΔTm even without amplification of the gene.

As another effect according to the present invention, the presence of methylation of a target gene can be detected using a difference between a Ct value for the amplification efficiency of the corresponding gene and the corresponding Ct value of the non-methylated gene by binding the PNA to a methylated sequence of a target gene to selectively suppress amplification of the methylated DNA. On the other hand, the presence of methylation of a target gene can be detected through ΔΔCt (ΔΔCt=non-methyl ΔCt−methyl ΔCt) analysis using a Ct value of the methylated gene and a Ct value (methyl ΔCt) of an internal control gene (beta actin, GAPDH, or the like) and a difference in Ct value (non-methyl ΔCt) between the non-methylated gene and the internal control gene.

Also, the method for detecting a methylated gene according to the present invention can easily detect a methylated gene using only a one-step process without pretreatment with bisulfite, and can detect the presence of methylation with high accuracy because an error is unlikely to occur during methylation detection due to the treatment with bisulfite.

Further, the method for detecting a methylated gene according to the present invention can detect the presence of methylation through an imaging technique using a fluorescent material without a process for amplifying a gene by PCR. The methylation can be quantitatively detected through the intensity and distribution of the imaged fluorescence signal.

DESCRIPTION OF DRAWINGS

FIG. 1 is a graph showing melting curves for Comparative Example 1(A) and Example 1(B) of the present invention.

FIG. 2 is a graph showing the results of PCR amplification curves for methylation detection for Example 2(A) and Comparative Example 2(B) of the present invention.

FIG. 3 is a schematic diagram showing a technique for distinguishing the presence of methylation for Examples and Comparative Examples of the present invention.

BEST MODE

Hereinafter, the present invention will be described in detail. Unless otherwise defined, the terms used in this specification have the same meaning as commonly understood by one of ordinary skill in the art to which the present invention pertains. The drawings and embodiments of this specification are provided for one of ordinary skill in the art to easily understand and practice the present invention, and thus the contents that may unnecessarily obscure the subject matter of the present invention may be omitted from the drawings and embodiments. In this case, the present invention is not limited to the drawings and embodiments.

The term "methylation" used herein refers to a process of attaching a methyl group to bases constituting a gene. Preferably, the presence of methylation used herein refers to the presence of methylation that occurs on cytosine of a certain CpG site of a certain gene.

The term "Epi-sPNA" (epigenome-specific PNA) used herein may refer to a PNA that may interact with a methyl group of methylated cytosine of a target gene, that is, a PNA that is modified by binding of a hydrophobic substituent at a predetermined position.

A PNA oligomer used herein may refer to a polymer obtained by polymerizing two or more PNA monomers via a peptide bond.

The term "specific binding" used herein may refer to a complementary binding of 70% or more of a base sequence of PNA to a methylated and non-methylated gene, preferably may refer to a complementary binding of 80% or more, more preferably 90% or more, and the most preferably 95% or more of a base sequence of PNA to a methylated and non-methylated gene.

The present invention provides a peptide nucleic acid (PNA) oligomer represented by the following Formula 1:

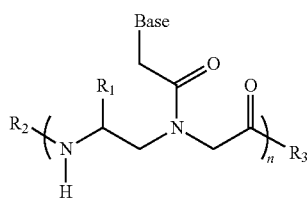

[Formula 1]

wherein $R_1$ is a hydrophobic substituent, $R_2$ is hydrogen or a hydrophobic substituent, $R_3$ is a hydroxyl group or a hydrophobic substituent, Base is any one base selected from natural or non-natural nucleobases including adenine, thymine, guanine, cytosine, and uracil, n is an integer ranging from 5 to 30, and respective structural units included in the PNA probe may be the same or different from each other. Preferably, n may be an integer ranging from 8 to 24, but the present invention is not particularly limited thereto.

Specifically, the non-natural nucleobases may include purine, 2,6-diaminopurine, 7-deazaadenine, 7-deazaguanine, $N^4N^4$-ethanocytosine, $N^6N^6$-ethano-2,6-diaminopurine, 5-methylcytosine, 5-$(C_3-C_6)$-alkanyluracil, 5-$(C_3-C_6)$-alkynylcytosine, 5-fluorouracil, and pseudoisocytosine, but the present invention is not particularly limited thereto.

The PNA oligomer according to the present invention may be in a form in which a hydrophobic substituent is bound to a certain position of the backbone of PNA, that is, may be in a form in which a hydrophobic substituent is bound to the gamma position, N-terminus, C-terminus, or both termini of the basic backbone of PNA, preferably in a form in which a hydrophobic substituent is bound to the gamma position of the basic backbone of PNA. At least one hydrophobic substituent may be continuously or intermittently bound to the PNA probe.

The hydrophobic substituent of Formula 1 signified in the present invention is each independently selected from the group consisting of a $C_3$-$C_{30}$ alkyl group, a $C_3$-$C_{30}$ alkenyl group, a $C_3$-$C_{30}$ alkynyl group, a $C_6$-$C_{30}$ aryl group, a $C_3$-$C_{30}$ heteroaryl group, an amino acid including a hydrophobic group, and a combination thereof, any one or more of hydrogen atoms of the hydrophobic substituent may be replaced by a halogen element, any one or more of carbon atoms of the alkyl group, the alkenyl group, or the alkynyl group may be replaced by O or S, and the heteroaryl group may include any one or more selected from B, N, O, S, P(=O), Si, and P.

Specifically, the hydrophobic substituent of $R_1$ in Formula 1 may include any one or more selected from the group consisting of a $C_3$-$C_{30}$ alkyl group, a $C_3$-$C_{30}$ alkenyl group, a $C_3$-$C_{30}$ alkynyl group, a $C_6$-$C_{18}$ aryl group, and a $C_4$-$C_{15}$ heteroaryl group, and the heteroaryl group may preferably include N, but the present invention is not particularly limited thereto.

More specifically, the hydrophobic substituent of $R_1$ in Formula 1 may include any one or more selected from the group consisting of a $C_6$-$C_{20}$ alkyl group, a $C_6$-$C_{20}$ alkenyl group, and a $C_6$-$C_{20}$ alkynyl group. The hydrophobic substituent of $R_1$ in Formula 1 may be preferably selected from a $C_8$-$C_{18}$ alkyl group, a $C_8$-$C_{18}$ alkenyl group, or a $C_8$-$C_{18}$ alkynyl group. However, hydrophobic substituents are not particularly limited as long as they may bind to the backbone of PNA to induce a hydrophobic interaction with methyl groups.

The hydrophobic substituent bound to the gamma position, any one terminus, or both termini of the PNA oligomer may increase a binding force to a target gene without any steric hindrance through a hydrophobic interaction with methyl groups of the target gene.

Also, the amino acid including a hydrophobic group may each independently include any one selected from the group consisting of isoleucine (Ile), valine (Val), leucine (Leu), phenylalanine (Phe), cysteine (Cys), methionine (Met), alanine (Ala), glycine (Gly), threonine (Thr), and tryptophan (Trp). Preferably, the amino acid including a hydrophobic group may each independently include any one selected from the group consisting of isoleucine (Ile), valine (Val), leucine (Leu), phenylalanine (Phe), and cysteine (Cys), but the present invention is not particularly limited thereto.

A hydrophobic interaction between a hydrophobic group bound to a side chain of the amino acid and a methyl group bound to the methylated gene may show stronger intermolecular binding force, compared to the non-methylated gene.

The present invention provides a peptide nucleic acid (PNA) probe for detecting a methylated gene, which is represented by the following Formula 1:

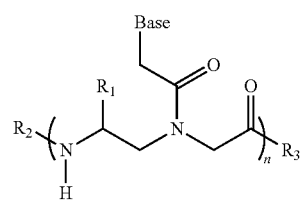

[Formula 1]

wherein $R_1$ is a hydrophobic substituent, $R_2$ is hydrogen or a hydrophobic substituent, $R_3$ is a hydroxyl group or a hydrophobic substituent, Base is any one base selected from natural or non-natural nucleobases including adenine, thymine, guanine, cytosine, and uracil, n is an integer ranging from 5 to 30, and respective structural units included in the PNA probe for detecting a methylated gene may be the same or different from each other. Preferably, n may be an integer ranging from 8 to 24, but the present invention is not particularly limited thereto.

The hydrophobic substituent of Formula 1 is each independently selected from the group consisting of a $C_3$-$C_{30}$ alkyl group, a $C_3$-$C_{30}$ alkenyl group, a $C_3$-$C_{30}$ alkynyl group, a $C_6$-$C_{30}$ aryl group, a $C_3$-$C_{30}$ heteroaryl group, an amino acid including a hydrophobic group, and a combination thereof, any one or more of hydrogen atoms of the hydrophobic substituent may be replaced by a halogen element, any one or more of carbon atoms of the alkyl group, the alkenyl group, or the alkynyl group may be replaced by O or S, and the heteroaryl group may include any one or more selected from B, N, O, S, P(=O), Si, and P.

Specifically, the hydrophobic substituent of $R_1$ in Formula 1 may include any one or more selected from the group consisting of a $C_3$-$C_{30}$ alkyl group, a $C_3$-$C_{30}$ alkenyl group, a $C_3$-$C_{30}$ alkynyl group, a $C_6$-$C_{18}$ aryl group, and a $C_4$-$C_{15}$ heteroaryl group, and the heteroaryl group may preferably include N, but the present invention is not particularly limited thereto.

More specifically, the hydrophobic substituent of $R_1$ in Formula 1 may include any one or more selected from the group consisting of a $C_6$-$C_{20}$ alkyl group, a $C_6$-$C_{20}$ alkenyl group, and a $C_6$-$C_{20}$ alkynyl group. The hydrophobic substituent of $R_1$ in Formula 1 may be preferably selected from a $C_8$-$C_{18}$ alkyl group, a $C_8$-$C_{18}$ alkenyl group, or a $C_8$-$C_{18}$ alkynyl group. However, hydrophobic substituents are not particularly limited as long as they may bind to the backbone of PNA to induce a hydrophobic interaction with methyl groups.

The amino acid including a hydrophobic group may each independently include any one selected from the group consisting of isoleucine (Ile), valine (Val), leucine (Leu), phenylalanine (Phe), cysteine (Cys), methionine (Met), alanine (Ala), glycine (Gly), threonine (Thr), and tryptophan (Trp). Preferably, the amino acid including a hydrophobic group may each independently include any one selected from the group consisting of isoleucine (Ile), valine (Val), leucine (Leu), phenylalanine (Phe), and cysteine (Cys), but the present invention is not particularly limited thereto.

A hydrophobic interaction between a hydrophobic group bound to a side chain of the amino acid and a methyl group bound to the methylated gene may show stronger intermolecular binding force, compared to the non-methylated gene.

The hydrophobic substituent bound to the gamma position, any one terminus, or both termini of the PNA probe may increase a binding force to a target gene without any steric hindrance through a hydrophobic interaction with methyl groups of the target gene.

The expression "for detecting a methylated gene" means that a degree of methylation of a gene may be measured to diagnose cancer at an early stage, or may be used as a part of a gene test to predict a pattern of cancer progression after surgery and predict the response to drugs.

Therefore, the methylated gene may be a cancer-specific methylated DNA, for example, p14, p16, or Cyclin D, which is involved in the cell cycle regulation, Twist or E-cadherin, which is involved in the cell adhesion, MGMT or h-MLH, which is involved in the DNA repair, or RASSF1α, DAPK, HIN-1, or RARβ, which is involved in a cell signaling pathway, but the present invention is not particularly limited thereto.

The cancer may include any one selected from the group consisting of breast cancer, prostate cancer, bladder cancer, colon cancer, lung cancer, pancreatic cancer, acute promyelocytic leukemia, ovarian cancer, brain tumor, head and neck carcinoma, melanoma, myeloma, lymphoma, gastric cancer, non-small-cell lung cancer, liver cancer, esophagus cancer, small intestine cancer, endometrial carcinoma, renal cancer, skin cancer, bone cancer, thyroid cancer, and spinal cord tumor, but the present invention is not particularly limited thereto.

The PNA probe for detecting a methylated gene according to the present invention may hybridize with a gene having a complementary base sequence to form a double strand. A PNA/DNA double strand is more stable than a DNA/DNA double strand. This is because the DNA/DNA double strand includes a repulsive force of negative charges due to the basic backbone structure of negatively charged DNA, whereas a binding force is not offset by the repulsive force because the PNA is electrically neutral.

The PNA probe for detecting a methylated gene according to the present invention may be based on the principle that it further enhances binding stability to a methylated target gene to inhibit amplification of the target gene and has a relatively weak binding force to a non-methylated gene to amplify the non-methylated gene.

However, the present invention is not limited thereto, and a methylated gene may be detected without amplification of the gene using a ΔTm value reflecting a difference between a binding force of the PNA probe to the methylated target gene and a binding force of the PNA probe to the non-methylated gene.

Specifically, guanine bases of the PNA bind to cytosine bases corresponding to their complementary bases, and the complementary binding forms a strong intermolecular attraction when a guanine or cytosine base binds to three hydrogen atoms. In this case, the methylated cytosine is a cytosine residue whose methyl group is bound to the 5th carbon atom of a pyrimidine ring, wherein the methyl group serves as an electron donating group (EDG) so that the methylated cytosine may form a stronger hydrogen bond with a guanine base complementary to the methylated cytosine.

The PNA probe for detecting a methylated gene according to the present invention may not only form a stronger hydrogen bond to the methylated cytosine compared to the non-methylated cytosine but may also make a stronger intermolecular interaction with the methylated cytosine as a modified PNA to which a hydrophobic substituent is bound, compared to the normal form of PNA. For example, because the methyl group has a hydrophobic property, cytosine to which the methyl group is bound may induce a hydrophobic interaction with the PNA probe to which the hydrophobic substituent is bound to form a stronger intermolecular attraction with a hydrogen bond between cytosine and guanine.

The PNA probe may further include any one selected from the group consisting of a reporter and a quencher, or a combination of two thereof. As a preferred example, the PNA probe may be a PNA probe including a reporter bound to the C-terminus thereof and a quencher bound to the N-terminus thereof, or a PNA probe including a reporter bound to the N-terminus thereof and a quencher bound to the C-terminus thereof.

According to the present invention, the reporter is a fluorescence donor that emits light with a wavelength ranging from 400 nm to 800 nm, and may include any one or more selected from the group consisting of fluorescein, fluorescein chlorotriazinyl, rhodamine green, rhodamine red, tetramethylrhodamine, FITC, oregon green, Alexa Fluor, FAM (6-carboxyfluorescein), Texas red, HEX (2,4,5,7-tetrachloro-6-carboxy-4,7-dichlorofluorescein), JOE, ROX, TET, TRITC, TEMRA, CY3, and CY5, but the present invention is not particularly limited thereto.

According to the present invention, the quencher is a fluorescence acceptor that absorbs luminous energy from the reporter, and may include any one or more selected from the group consisting of TAMRA (6-carboxytetramethyl-rhodamine), Eclipse, DDQ, QSY, Blackberry Quencher, BHQ1, BHQ2, Dabcyl (4,4-Dimethylamino-azobenzene-4-carboxylic acid), Iowa black, FQ, and IRDye QC-1, but the present invention is not particularly limited thereto.

Because the PNA probe according to the present invention includes any one selected from the group consisting of a reporter and a quencher, or a combination of two thereof, a fluorescence signal is generated when the PNA probe is hybridized with a non-methylated gene or a target gene for methylation analysis to form a hybrid. According to one embodiment of the present invention, the PNA probe includes any one selected from the group consisting of a reporter and a quencher, or a combination of two thereof, but the present invention is not particularly limited thereto. The reporter or quencher may be bound to the non-methylated gene or the target gene for methylation analysis.

When a temperature of the hybrid is gradually changed, the PNA probe and the gene, both of which have a double strand, are rapidly melted at a proper melting temperature to quench a fluorescence signal. In this case, a temperature at a moment when the fluorescence signal is quenched may refer to Tm. The presence of gene methylation may be checked by measuring ΔTm between the non-methylated gene and the PNA probe or ΔTm between the target gene for methylation analysis and the PNA probe.

The present invention provides a method for detecting the presence of gene methylation using the PNA probe for detecting a methylated gene. Specifically, the present invention provides a method for detecting a methylated gene, which includes: preparing a first mixture including a non-methylated gene and a PNA probe represented by the following Formula 1, which may specifically bind to a base sequence of the non-methylated gene; preparing a second mixture including a target gene for methylation analysis, which includes the same base sequence as the base sequence of the non-methylated gene, and the PNA probe represented by the following Formula 1; changing temperatures of the first mixture and the second mixture; and analyzing a melting curve by measuring melting temperatures (Tm) of the first mixture and the second mixture according to the temperature change:

[Formula 1]

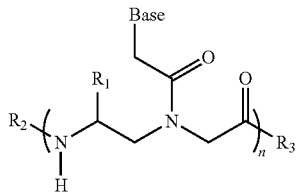

wherein $R_1$ is a hydrophobic substituent, $R_2$ is hydrogen or a hydrophobic substituent, $R_3$ is a hydroxyl group or a hydrophobic substituent, Base is any one base selected from natural or non-natural nucleobases including adenine, thymine, guanine, cytosine, and uracil, n is an integer ranging from 5 to 30, and respective structural units included in the PNA probe may be the same or different from each other. Preferably, n may be an integer ranging from 8 to 24, but the present invention is not particularly limited thereto.

The hydrophobic substituent of Formula 1 is each independently selected from the group consisting of a $C_3$-$C_{30}$ alkyl group, a $C_3$-$C_{30}$ alkenyl group, a $C_3$-$C_{30}$ alkynyl group, a $C_6$-$C_{30}$ aryl group, a $C_3$-$C_{30}$ heteroaryl group, an amino acid including a hydrophobic group, and a combination thereof, any one or more of hydrogen atoms of the hydrophobic substituent may be replaced by a halogen element, any one or more of carbon atoms of the alkyl group, the alkenyl group, or the alkynyl group may be replaced by O or S, and the heteroaryl group may include any one or more selected from B, N, O, S, P(=O), Si, and P.

Specifically, the hydrophobic substituent of $R_1$ in Formula 1 may include any one or more selected from the group consisting of a $C_3$-$C_{30}$ alkyl group, a $C_3$-$C_{30}$ alkenyl group, a $C_3$-$C_{30}$ alkynyl group, a $C_6$-$C_{18}$ aryl group, and a $C_4$-$C_{15}$ heteroaryl group, and the heteroaryl group may preferably include N, but the present invention is not particularly limited thereto.

More specifically, the hydrophobic substituent of $R_1$ in Formula 1 may include any one or more selected from the group consisting of a $C_6$-$C_{20}$ alkyl group, a $C_6$-$C_{20}$ alkenyl group, and a $C_6$-$C_{20}$ alkynyl group. The hydrophobic substituent of $R_1$ in Formula 1 may be preferably selected from a $C_8$-$C_{18}$ alkyl group, a $C_8$-$C_{18}$ alkenyl group, or a $C_8$-$C_{18}$ alkynyl group. However, hydrophobic substituents are not particularly limited as long as they may bind to the backbone of PNA to induce a hydrophobic interaction with methyl groups.

The amino acid including a hydrophobic group may each independently include any one selected from the group consisting of isoleucine (Ile), valine (Val), leucine (Leu), phenylalanine (Phe), cysteine (Cys), methionine (Met), alanine (Ala), glycine (Gly), threonine (Thr), and tryptophan (Trp). Preferably, the amino acid including a hydrophobic group may each independently include any one selected from the group consisting of isoleucine (Ile), valine (Val), leucine (Leu), phenylalanine (Phe), and cysteine (Cys), but the present invention is not particularly limited thereto.

A hydrophobic interaction between a hydrophobic group bound to a side chain of the amino acid and a methyl group bound to the methylated gene may show a stronger intermolecular binding force, compared to the non-methylated gene.

The temperature change may be in a range of 30° C. to 95° C., preferably in a range of 40° C. to 90° C.

The melting of the double strand may be achieved at a relatively high temperature due to the formation of the strong intermolecular attraction between the methylated cytosine of the target gene and the PNA probe. Specifically, the binding of Epi-sPNA to a gene having non-methylated cytosines is made only via a basic hydrogen bond. On the other hand, Epi-sPNA and a gene including methylated cytosines are bound via a hydrophobic interaction in addition to the basic hydrogen bond. As a result, a difference in denaturation temperatures between the hydrogen bond and the hydrophobic interaction is greater than or equal to 3° C. Therefore, when ΔTm is shown to be greater than or equal to 3° C., the gene may be judged to be methylated. Preferably, the difference in denaturation temperature may be greater than or equal to 5° C., more preferably greater than or equal to 10° C. When the gene includes methylated cytosines, the denaturation temperature becomes higher due to the stronger binding force. However, this temperature difference may vary depending on the number of methylated cytosines, but the present invention is not particularly limited thereto.

According to the present invention, the melting curve analysis may be performed using a fluorescence melting curve analysis (FMCA) method, but the present invention is not particularly limited thereto.

The fluorescence melting curve analysis may be performed by analyzing a melting curve using a fluorescent material. In this case, each of the mixtures may further include a fluorescence-labeled material. The target gene, the non-methylated gene, or the Epi-sPNA may include a fluorescence-labeled material. Preferably, the Epi-sPNA may include a fluorescence-labeled material. The fluorescence-labeled material may be any one selected from a reporter and a quencher, or a combination of two thereof. In addition, the fluorescence-labeled material may be an intercalating fluorescent material.

In the present invention, the reporter refers to a material that absorbs and emits light with a certain wavelength to emit fluorescence, that is, a material with which a probe is labeled to check that a target nucleic acid is hybridized with the probe, and the quencher refers to a material that absorbs light emitted from the reporter material to reduce fluorescence intensity.

The intercalating fluorescent material may be selected from the group consisting of an acridine homodimer and derivatives thereof, Acridine Orange and derivatives thereof, 7-aminoactinomycin D (7-AAD) and derivatives thereof, actinomycin D and derivatives thereof, 9-amino-6-chloro-2-methoxyacridine (ACMA) and derivatives thereof, DAPI and derivatives thereof, dihydroethidium and derivatives thereof, ethidium bromide and derivatives thereof, an ethidium homodimer-1 (EthD-1) and derivatives thereof, an ethidium homodimer-2 (EthD-2) and derivatives thereof, ethidium monoazide and derivatives thereof, hexidium iodide and derivatives thereof, bisbenzimide (Hoechst 33258) and derivatives thereof, Hoechst 33342 and derivatives thereof, Hoechst 34580 and derivatives thereof, hydroxystilbamidine and derivatives thereof, LDS 751 and derivatives thereof, propidium iodide (PI) and derivatives thereof, and Cy-dye derivatives.

Specifically, the Epi-sPNA may include a reporter and a quencher. Because the Epi-sPNA includes the reporter and the quencher, a fluorescence signal may be generated after the Epi-sPNA is hybridized with a gene by complementary binding to the gene, and the fluorescence signal is quenched when the complementary binding of the Epi-sPNA to the gene is dissociated at a denaturation temperature as the temperature of the hybridized mixture increases. The presence of gene methylation may be determined through the melting curve analysis obtained from the fluorescence signal and the quenched signal according to this temperature change.

The temperature of each of the mixtures may be changed from 30° C. to 95° C., preferably from 40° C. to 90° C. at a rate of 0.1° C./s to 20° C./s, preferably at a rate of 0.2° C./s to 15° C./s, and more preferably at a rate of 0.5° C./s to 10° C./s. When the temperature of each of the mixtures reaches any certain temperature, the PNA/DNA double strands are separated by dissociation of the complementary binding. In this case, the temperature is a melting temperature (Tm), and the melting temperature may be checked by disappearance of the fluorescence signal.

The analyzing of the melting curve may include judging a gene to be methylated when it is assumed that $\Delta Tm$ is greater than or equal to 3° C. when the $\Delta Tm$ is measured. Preferably, the $\Delta Tm$ may be greater than or equal to 5° C. More preferably, the $\Delta Tm$ may be greater than or equal to 10° C. In this case, the $\Delta Tm$ satisfies the following equation: $\Delta Tm=Tm$ (Target Gene for Methylation Analysis)$-Tm$ (Non-methylated Gene Including the Same Base Sequence as Target Gene for Methylation Analysis). Because the binding force between the methylated cytosine and the Epi-sPNA is stronger than the binding force between the non-methylated cytosine and the Epi-sPNA, the melting temperature becomes higher when the Epi-sPNA is bound to the methylated cytosine.

The method for detecting gene methylation according to the present invention enables easy detection of gene methylation only by measuring the Tm according to the temperature change of each of the mixtures without amplification of the gene in the step of measuring Tm according to the temperature change to analyze a melting curve.

According to one embodiment of the present invention, the method for detecting a methylated gene may include preparing a first mixture including a non-methylated gene and a PNA probe represented by the following Formula 1, which may specifically bind to a base sequence of the non-methylated gene; preparing a second mixture including a target gene for methylation analysis, which includes the same base sequence as the base sequence of the non-methylated gene, and the PNA probe represented by the following Formula 1; subjecting the first mixture and the second mixture to a polymerase chain reaction (PCR); and measuring a cycle threshold ($\Delta Ct$) value of the PCR. In this case, the cycle threshold ($\Delta Ct$) value satisfies the following equation: $\Delta Ct=Ct$ (Target Gene)$-Ct$ (Non-methylated Gene Including the Same Base Sequence as Target Gene).

The gene-amplified product obtained by a polymerase chain reaction (PCR) may be determined by the intercalating fluorescent material. In particular, a real-time PCR (RT-PCR uses a fluorescent dye to observe the entire reaction. In this case, the fluorescent dye increases proportionally as the amplified product is accumulated in every amplification cycle. At the beginning of amplification, an increase in fluorescence is not detected, but the accumulated fluorescence intensity is detected by the machine as the amplifications are performed predetermined times or more. Then, the fluorescence significantly increases so that an increase in the fluorescence can be detected over the background level. The number of amplification cycles at this time is referred to as a cycle threshold (Ct).

Specifically, the gene may be amplified through the PCR in the present invention. The Epi-sPNA probe hybridized with the methylated gene binds more strongly to the methylated gene due to the strong action of intermolecular attraction caused by the hydrogen bond and the hydrophobic interaction, compared to when the Epi-sPNA probe is hybridized with the non-methylated gene. As a result, because the gene amplification is inhibited, the Ct value is found to be high. That is, the presence of methylation may be checked by determining a $\Delta Ct$ value obtained by subtracting a Ct value of the same gene in a control sample from a Ct value of a target gene.

According to the method for detecting gene methylation according to the present invention, the $\Delta Ct$ may be greater than 0.5. Preferably, the $\Delta Ct$ may be greater than 1.

The present invention provides a kit for use in the method for detecting a methylated gene according to the present invention, which includes a PNA probe represented by the following Formula 1, which may specifically bind to a base sequence of a gene whose methylation may occur:

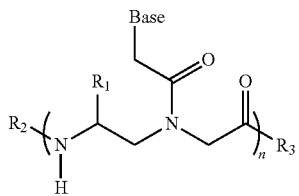

[Formula 1]

wherein $R_1$ is a hydrophobic substituent, $R_2$ is hydrogen or a hydrophobic substituent, $R_3$ is a hydroxyl group or a hydrophobic substituent, Base is any one base selected from natural or non-natural nucleobases including adenine, thymine, guanine, cytosine, and uracil, n is an integer ranging from 5 to 30, and respective structural units included in the PNA probe may be the same or different from each other. Preferably, n may be an integer ranging from 8 to 24, but the present invention is not particularly limited thereto.

The present invention provides a method for detecting gene methylation, which includes mixing the PNA probe with a biological sample to hybridize the PNA probe with a target gene included in the biological sample; applying heat to the resulting mixture at a temperature higher than a melting temperature (Tm) of a hybrid of a non-methylated gene and the PNA probe and lower than a hybrid of a methylated gene and the PNA probe; and removing the hybrid of the non-methylated gene and the PNA probe melted at the temperature, wherein the gene methylation is detected through an imaged fluorescence signal of the hybrid of the methylated gene and the PNA probe.

By using a difference in the binding temperature between the PNA probe and the methylated gene or the non-methylated gene, a biological sample corresponding to tissues and cells including a gene to be detected may be allowed to bind in vitro to the PNA probe including a fluorescent material. The presence of methylation of the target gene in the corresponding biological sample may be detected by detecting a fluorescence signal at a certain temperature at which the binding of the PNA probe to the methylated gene having a high binding temperature is maintained and the binding of the PNA probe to the non-methylated gene having a low binding temperature may be dissociated.

Hereinafter, the present invention will be described with reference to examples thereof. However, it should be understood that the following examples are illustrative only to describe the present invention in more detail, but are not intended to limit the scope of the present invention.

MODE FOR INVENTION

<Example 1> Analysis of Binding Temperature of Epi-sPNA Probe to Non-Methylated or Methylated Target DNA An Epi-sPNA probe (0.1 µM; Seasun Biomaterials, Korea) of SEQ ID NO: 2, a non-methylated DNA oligomer (0.1 µM; Integrated DNA Technologies, USA) of SEQ ID NO: 3, a methylated DNA oligomer (0.1 µM; Integrated DNA Technologies, USA) of SEQ ID NO: 4, and 10 µL of a 2×PCR amplification solution (Seasun Biomaterials, Korea) were added to 7 µL of distilled water, and mixed. Thereafter, the mixture was reacted at 95° C. for 5 minutes, cooled to 40° C., and heated at a rate of 2° C./s by 1° C. from 40° C. to 90° C. using a real-time PCR machine (CFX96™ Real-time PCR System, Bio-Rad, USA). Then, the melting curve analysis was performed by measuring the PCR product at a fluorescence wavelength of 510 nm without a gene amplification process. The sequences used in this experiment are listed in Table 1 below.

<Comparative Example 1> Analysis of Binding Temperature of Non-Methylated or Methylated Target DNA Bound to Normal PNA Probe This experiment was performed in the same manner as in Example 1, except that the normal PNA probe of SEQ ID NO: 1 was used instead of the Epi-sPNA probe.

TABLE 1

| SEQ ID NO | Sequence Name | Sequence (N' → C') | Note |
|---|---|---|---|
| 1 | PNA_1 | Dabcyl-ACCCCGCGATCA-O-K(FAM) | Normal PNA |
| 2 | Epi-sPNA | Dabcyl-ACCCCG"CG"ATCA-O-K(FAM) | MS PNA |
| 3 | DNA_UC | CCAGCTGCGCGTTGACCGCGGGGTCCGACATGATGGCTGG | Non-methylated target DNA |
| 4 | DNA_MC | CCAGCTGCGCGTTGACCGCGGGGTCCGACATGATGGCTGG | Methylated target DNA |

G": Guanine base modified by hydrophobic substituent
C: Methylated cytosine base
O: Linker
G: Base complementary to methylated cytosine base
K: Lysine FIG. 1A is a graph showing the results for Comparative Example 1, and FIG. 1B is a graph showing the results for Example 1. It was revealed that the ΔTm was 1° C. in the case of Comparative Example 1, and the ΔTm was 13° C. in the case of Example 1 using the Epi-sPNA probe. Based on these results, it can be seen that the sensitivity and specificity were able to be remarkably enhanced during the detection of methylation because a stronger binding force to the methylated DNA was applied to the modified Epi-sPNA to which the hydrophobic substituent was bound, compared to the non-modified PNA.

<Example 2> Analysis of ΔCt of Non-Methylated or Methylated Target DNA Bound to Epi-sPNA Probe PCR amplification was performed using 45 ng of genomic DNA, DNA primers of SEQ ID NOS: 5 and 6 (0.1 μM), an Epi-sPNA probe of SEQ ID NO: 2 (0.1 μM), and 10 μL of a 1×PCR amplification solution (Seasun Biomaterials, Korea). The PCR amplification conditions were as follows. The resulting mixture was reacted at 95° C. for 5 minutes, followed by a total of 25 cycles at 95° C. for 30 seconds, at 58° C. for 30 seconds, and at 72° C. for 30 seconds, and then reacted at 72° C. for 5 minutes using a real-time PCR machine (CFX96™ Real-time PCR System, Bio-Rad, USA). Then, the mixture was reacted at 72° C. for 5 minutes.

Human HCT116 DKO Non-Methylated DNA (Cat #D5014-01, Zymo Research, USA) was used as the non-methylated target DNA, and Human HCT116 DKO Methylated DNA (Cat #D5014-02, Zymo Research, USA) was used as the methylated DNA.

<Comparative Example 2> Analysis of ΔCt of Non-Methylated or Methylated Target DNA Using SYBR Green Intercalating Dye DNA and primers were used under the same conditions as in Example 2, and PCR was performed using an SYBR green dye (1×) as the intercalating dye instead of the Epi-sPNA. PCR was also performed under the same PCR conditions as in Example 2.

TABLE 2

| SEQ ID NO | Sequence Name | Sequence (N' → C') | Note |
|---|---|---|---|
| 5 | Sep_F | GCCGCAGCAGCCAGCCA | Forward Primer |
| 6 | SepR_C2 | ACCAGCCATCATGTCGGACC | Reverse Primer |

FIG. 2A is a graph showing the results of PCR amplification curves for detection of DNA methylation using the Epi-sPNA probe. Here, a ΔCt value was shown to be 3. FIG. 2B is a graph showing the results of PCR amplification curves using an intercalating dye. Here, the ΔCt value is normalized according to the concentration of the target DNA. As a result, the ΔCt value was shown to be 0.

These results show that the amplification of the target gene was inhibited due to the strong interaction with methylated cytosines when the Epi-sPNA probe was used, compared to the non-methylated gene. From the results, it can be seen that the presence of gene methylation was able to be detected by measuring the ΔCt values.

The invention claimed is:

1. A method for detecting a methylated gene using the PNA probe represented by the following Formula 1, which comprises:
  preparing a first mixture comprising a non-methylated gene and the PNA probe represented by the following Formula 1 which is able to specifically bind to a base sequence of the non-methylated gene;
  preparing a second mixture comprising a target gene for methylation analysis, which comprises the same base sequence as the base sequence of the non-methylated gene, and the PNA probe represented by the following Formula 1;
  subjecting the first mixture and the second mixture to a polymerase chain reaction (PCR); and
  measuring a cycle threshold ($\Delta Ct$) value of the PCR:

$$[\Delta Ct = Ct_{(Target\ Gene\ for\ Methylation\ Analysis)} - Ct_{(Non-methylated\ Gene\ Comprising\ the\ Same\ Base\ Sequence\ as\ Target\ Gene\ for\ Methylation\ Analysis)}]$$

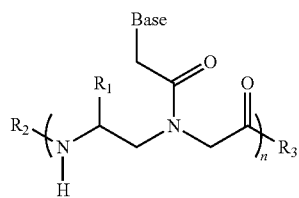

[Formula 1]

wherein,
  $R_1$ is a hydrophobic substituent, $R_2$ is hydrogen or a hydrophobic substituent, $R_3$ is a hydroxyl group or a hydrophobic substituent,
  Base is any one base selected from natural or non-natural nucleobases wherein the natural bases comprise adenine, thymine, guanine, cytosine, and uracil, and the non-natural nucleobases comprise purine, 2,6-diaminopurine, 7-deazaadenine, 7-deazaguanine, $N^4N^4$-ethanocytosine, $N^6N^6$-ethano-2,6-diaminopurine, 5-methylcytosine, 5-($C_3C_6$)-alkanyluracil, 5-($C_3C_6$)-alkynylcytosine, 5-fluorurocil, and pseudoisocytosine, n is an integer ranging from 5 to 30, and respective structural units included in the PNA probe are able to be the same or different from each other.

2. The method of claim 1, which comprises:
  preparing a first mixture comprising a non-methylated gene and the PNA probe, which is able to specifically bind to a base sequence of the non-methylated gene;
  preparing a second mixture comprising a target gene for methylation analysis, which comprises the same base sequence as the base sequence of the non-methylated gene, and the PNA probe;
  changing temperatures of the first mixture and the second mixture; and
  analyzing a melting curve by measuring melting temperatures (Tm) of the first mixture and the second mixture according to the temperature change.

3. The method of claim 2, wherein the analyzing of the melting curve comprises judging a gene to be methylated when it is assumed that $\Delta Tm$ is greater than or equal to 3° C. when the $\Delta Tm$ is measured:

$$[\Delta Tm = Tm_{(Target\ Gene\ for\ Methylation\ Analysis)} - Tm_{(Non-methylated\ Gene\ Comprising\ the\ Same\ Base\ Sequence\ as\ Target\ Gene\ for\ Methylation\ Analysis)}].$$

4. A kit for use in the method for detecting a methylated gene defined in claim 1, comprising a PNA probe represented by the following Formula 1, which is able to specifically bind to a base sequence of a gene whose methylation is able to occur:

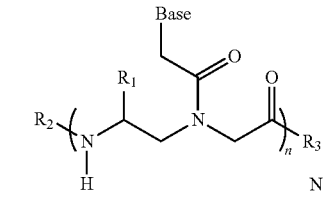

[Formula 1]

wherein,
  $R_1$ is a hydrophobic substituent, $R_2$ is hydrogen or a hydrophobic substituent, $R_3$ is a hydroxyl group or a hydrophobic substituent, Base is any one base selected from natural or non-natural nucleobases, wherein the natural nucleobase comprises adenine, thymine, guanine, cytosine, and uracil, and the non-natural nucleobases comprise purine, 2,6-diaminopurine, 7-deazaadenine, 7-deazaquanine, $N^4N^4$-ethanocytosine, $N^6N^6$-ethano-2,6-diaminopurine, 5-methylcytosine, 5-($C_3$-$C_6$)-alkanyluracil, 5-($C_3$-$C_6$)-alkynylcytosine, 5-fluorouracil, and pseudoisocytosine, n is an integer ranging from 5 to 30, and respective structural units included in the PNA probe are able to be the same or different from each other.

5. A kit for use in the method for detecting a methylated gene defined in claim 2, comprising a PNA probe represented by the following Formula 1, which is able to specifically bind to a base sequence of a gene whose methylation is able to occur:

[Formula 1]

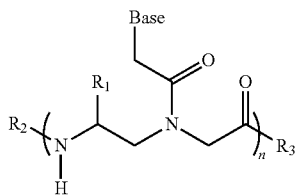

wherein, $R_1$ is a hydrophobic substituent, $R_2$ is hydrogen or a hydrophobic substituent, $R_3$ is a hydroxyl group or a hydrophobic substituent, Base is any one base selected from natural or non-natural nucleobases, wherein the natural nucleobase comprises adenine, thymine, guanine, cytosine, and uracil, and the non-natural nucleobases comprise purine, 2,6-diaminopurine, 7-deazaadenine, 7-deazaguanine, $N^4N^4$-ethanocytosine, $N^6N^6$-ethano-2,6-diaminopurine, 5-methylcytosine, 5-($C_3$-$C_6$)-alkanyluracil, 5-($C_3$-$C_6$)-alkynylcytosine, 5-fluorouracil, and pseudoisocytosine, n is an integer ranging from 5 to 30, and respective structural units included in the PNA probe are able to be the same or different from each other).

6. A kit for use in the method for detecting a methylated gene defined in claim 3, comprising a PNA probe represented by the following Formula 1, which is able to specifically bind to a base sequence of a gene whose methylation is able to occur:

[Formula 1]

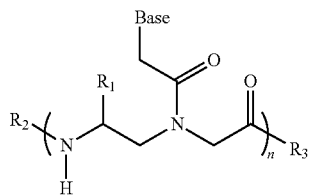

wherein, $R_1$ is a hydrophobic substituent, $R_2$ is hydrogen or a hydrophobic substituent, $R_3$ is a hydroxyl group or a hydrophobic substituent, Base is any one base selected from natural or non-natural nucleobases, wherein the natural nucleobase comprises adenine, thymine, guanine, cytosine, and uracil, and the non-natural nucleobases comprise purine, 2,6-diaminopurine, 7-deazaadenine, 7-deazaguanine, $N^4N^4$-ethanocytosine, $N^6N^6$-ethano-2,6-diaminopurine, 5-methylcytosine, 5-($C_3$-$C_6$)-alkanyluracil, 5-($C_3$-$C_6$)-alkynylcytosine, 5-fluorouracil, and pseudoisocytosine, n is an integer ranging from 5 to 30, and respective structural units included in the PNA probe are able to be the same or different from each other).

7. The method of claim 1, wherein the hydrophobic substituent of $R_1$ in Formula 1 comprises any one or more selected from the group consisting of a $C_3$-$C_{30}$ alkyl group, a $C_3$-$C_{30}$ alkenyl group, and a $C_3$-$C_{30}$ alkynyl group.

8. The method of claim 1, wherein the hydrophobic substituent of Formula 1 is each independently an amino acid comprising a hydrophobic group.

9. The method of claim 8, wherein the amino acid comprising a hydrophobic group each independently comprises any one selected from the group consisting of isoleucine (Ile), valine (Val), leucine (Leu), phenylalanine (Phe), cysteine (Cys), methionine (Met), alanine (Ala), glycine (Gly), threonine (Thr), and tryptophan (Trp).

* * * * *

SEQUENCE LISTING

```
<160> NUMBER OF SEQ ID NOS: 6

<210> SEQ ID NO 1
<211> LENGTH: 12
<212> TYPE: DNA
<213> ORGANISM: Artificial Sequence
<220> FEATURE:
<223> OTHER INFORMATION: PNA_1
<220> FEATURE:
<221> NAME/KEY: misc_feature
<222> LOCATION: (1)..(12)
<223> OTHER INFORMATION: note = Two Gs were replaced with "Base
      complementary to methylated cytosine base" at the 6th and 8th
      positions,
      respectively
<220> FEATURE:
<221> NAME/KEY: misc_feature
<222> LOCATION: (1)..(12)
<223> OTHER INFORMATION: note = Normal PNA
<220> FEATURE:
<221> NAME/KEY: misc_feature
<222> LOCATION: (1)..(12)
<223> OTHER INFORMATION: note = 5' end of the sequence binds to Dabcyl
      and 3' of the sequence binds to (FAM)
<220> FEATURE:
<221> NAME/KEY: misc_feature
<222> LOCATION: (1)..(12)
<223> OTHER INFORMATION: note = 3' end of the sequence binds to a linker
      "O" linked to Lysine "-O-K"

<400> SEQUENCE: 1
accccgcgat ca                                                        12

<210> SEQ ID NO 2
<211> LENGTH: 12
<212> TYPE: DNA
<213> ORGANISM: Artificial Sequence
```

```
<220> FEATURE:
<223> OTHER INFORMATION: Epi-sPNA
<220> FEATURE:
<221> NAME/KEY: misc_feature
<222> LOCATION: (1)..(12)
<223> OTHER INFORMATION: note = MS PNA
<220> FEATURE:
<221> NAME/KEY: misc_feature
<222> LOCATION: (1)..(12)
<223> OTHER INFORMATION: note = 3' end of the sequence binds to a linker
      "O" linked to Lysine "-O-K"
<220> FEATURE:
<221> NAME/KEY: misc_feature
<222> LOCATION: (1)..(12)
<223> OTHER INFORMATION: note = 5' end of the sequence binds to Dabcyl
      and 3' of the sequence binds to (FAM)
<220> FEATURE:
<221> NAME/KEY: misc_feature
<222> LOCATION: (1)..(12)
<223> OTHER INFORMATION: note = Two Gs were replaced with G'' "Guanine
      base modified by hydrophobic substituent" at the 6th and 8th
      positions, respectively

<400> SEQUENCE: 2
accccgcgat ca                                                          12

<210> SEQ ID NO 3
<211> LENGTH: 40
<212> TYPE: DNA
<213> ORGANISM: Artificial Sequence
<220> FEATURE:
<223> OTHER INFORMATION: DNA_UC
<220> FEATURE:
<221> NAME/KEY: misc_feature
<222> LOCATION: (1)..(40)
<223> OTHER INFORMATION: note = Non-methylated target DNA

<400> SEQUENCE: 3
ccagctgcgc gttgaccgcg gggtccgaca tgatggctgg                            40

<210> SEQ ID NO 4
<211> LENGTH: 40
<212> TYPE: DNA
<213> ORGANISM: Artificial Sequence
<220> FEATURE:
<223> OTHER INFORMATION: DNA_MC
<220> FEATURE:
<221> NAME/KEY: misc_feature
<222> LOCATION: (1)..(40)
<223> OTHER INFORMATION: note = Five Cs were replaced with "Methylated
      cytosine base" at the 8th, 10th, 17th, 19th and 26th positions,
      respectively
<220> FEATURE:
<221> NAME/KEY: misc_feature
<222> LOCATION: (1)..(40)
<223> OTHER INFORMATION: note = Methylated target DNA

<400> SEQUENCE: 4
ccagctgcgc gttgaccgcg gggtccgaca tgatggctgg                            40

<210> SEQ ID NO 5
<211> LENGTH: 17
<212> TYPE: DNA
<213> ORGANISM: Artificial Sequence
<220> FEATURE:
<223> OTHER INFORMATION: Sep_F

<400> SEQUENCE: 5
gccgcagcag ccagcca                                                     17

<210> SEQ ID NO 6
```

```
<211> LENGTH: 20
<212> TYPE: DNA
<213> ORGANISM: Artificial Sequence
<220> FEATURE:
<223> OTHER INFORMATION: SepR_C2

<400> SEQUENCE: 6
accagccatc atgtcggacc                                            20
```